(12) United States Patent
Mettrick et al.

(10) Patent No.: US 9,902,229 B2
(45) Date of Patent: Feb. 27, 2018

(54) METHODS AND SYSTEMS FOR OPTIMIZING VEHICLE RIDE USING ROAD PREVIEW

(71) Applicant: GM GLOBAL TECHNOLOGY OPERATIONS LLC, Detroit, MI (US)

(72) Inventors: Christopher J. Mettrick, Whitby (CA); Shiv G. Patel, Brampton (CA); Fahim Javid, Pickering (CA); Dhruv Oberoi, Pickering (CA); Ankur Agrawal, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 15/048,502

(22) Filed: Feb. 19, 2016

(65) Prior Publication Data
US 2017/0240018 A1 Aug. 24, 2017

(51) Int. Cl.
*B60G 17/0165* (2006.01)
*B60G 17/018* (2006.01)
*G05D 1/08* (2006.01)

(52) U.S. Cl.
CPC ..... *B60G 17/0165* (2013.01); *B60G 17/0182* (2013.01); *G05D 1/0891* (2013.01); *B60G 2204/62* (2013.01); *B60G 2400/82* (2013.01); *B60G 2400/821* (2013.01); *B60G 2401/21* (2013.01); *B60G 2600/187* (2013.01); *B60G 2800/01* (2013.01); *B60G 2800/162* (2013.01); *B60G 2800/87* (2013.01)

(58) Field of Classification Search
CPC ............ B60G 17/0165; B60G 17/0182; B60G 2204/62; B60G 2400/82; B60G 2800/01; B60G 2400/821; B60G 2401/21; B60G 2600/187; B60G 2800/162; B60G 2800/87; G05D 1/0891

See application file for complete search history.

(56) References Cited

U.S. PATENT DOCUMENTS

| | | | | |
|---|---|---|---|---|
| 5,432,700 A | * | 7/1995 | Hrovat | B60G 17/0165 280/5.515 |
| 8,676,508 B2 | * | 3/2014 | Schwarz | B60W 40/072 342/70 |
| 2004/0249545 A1 | * | 12/2004 | Lu | B60R 21/01336 701/70 |
| 2005/0080543 A1 | * | 4/2005 | Lu | B60G 17/018 701/70 |
| 2010/0152969 A1 | | 6/2010 | Li et al. | |
| 2012/0203428 A1 | * | 8/2012 | Choi | B60G 17/016 701/37 |
| 2013/0103259 A1 | | 4/2013 | Eng et al. | |
| 2014/0195112 A1 | * | 7/2014 | Lu | B60G 17/015 701/37 |
| 2015/0202939 A1 | * | 7/2015 | Stettner | B60R 21/0134 701/37 |
| 2017/0106855 A1 | * | 4/2017 | Lavoie | B60W 10/184 |

* cited by examiner

*Primary Examiner* — Richard M Camby
(74) *Attorney, Agent, or Firm* — Lorenz & Kopf, LLP

(57) ABSTRACT

Methods and systems are provided for controlling a suspension system of a vehicle. In one embodiment, the method includes: receiving, by a processor, sensor data indicative of conditions of a roadway in a path of the vehicle; determining, by a processor, a continuous road profile based on the sensor data; and selectively controlling, by a processor, at least one suspension element of the vehicle based on the continuous road profile.

14 Claims, 4 Drawing Sheets

METHODS AND SYSTEMS FOR OPTIMIZING VEHICLE RIDE USING ROAD PREVIEW

TECHNICAL FIELD

The technical field generally relates to vehicles, and more particularly to methods and systems for optimizing a vehicle ride using information from a road preview.

BACKGROUND

Passive suspension systems determine the vertical movement of a vehicle in response to the road surface the vehicle is traveling. Active suspension systems and semi-active suspension systems are types of automotive suspension systems that actively control the vertical movement of the wheels relative to the chassis or vehicle body with a control system. For example, semi-active suspension systems vary shock absorber firmness to match changing road or dynamic conditions. Active suspension systems use an actuator to raise and lower the chassis independently at each wheel.

Current semi-active suspension systems and active suspension systems cannot react fast enough to all road inputs. As a result the suspension systems must use either higher damping to account for high load events or make compromises in control.

Accordingly, it is desirable to provide improved methods and systems for controlling suspension systems. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling a suspension system of a vehicle. In one embodiment, the method includes: receiving, by a processor, sensor data indicative of conditions of a roadway in a path of the vehicle; determining, by a processor, a continuous road profile based on the sensor data; and selectively controlling, by a processor, at least one suspension element of the vehicle based on the continuous road profile.

In one embodiment, a system includes: at least one sensor that generates sensor signals based on conditions of a roadway in a path of the vehicle; and a control module that receives the sensor signals, that determines a continuous road profile based on the sensor signals, and that selectively controls at least one suspension element of the vehicle based on the continuous road profile.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1A:
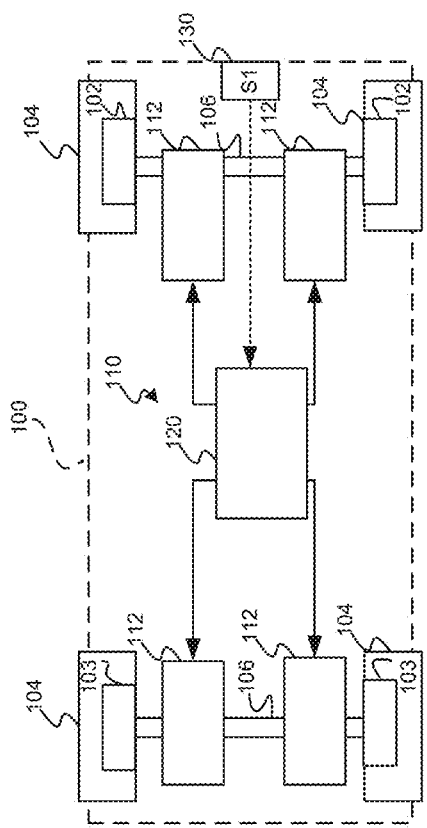
FIG. 1A is a functional block diagram of an exemplary vehicle having a suspension control system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of suspension control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1B:
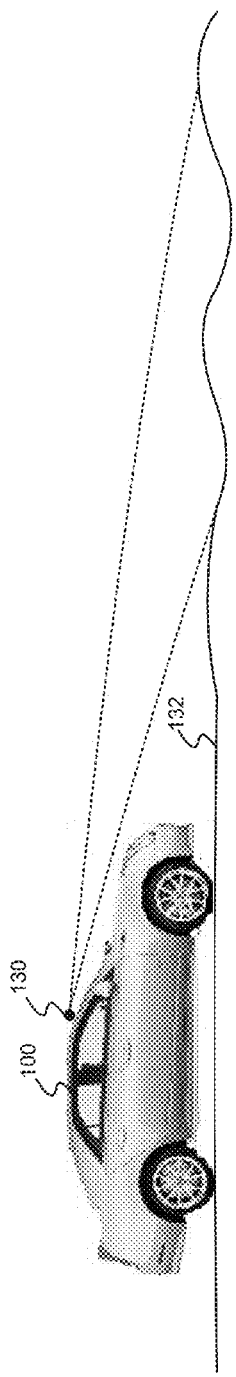
FIG. 1B is an illustration of the exemplary vehicle traveling on a roadway in accordance with various embodiments.

With reference to FIGS. 1A and 1B, an exemplary vehicle 100 that includes a suspension system 110 is shown in accordance with exemplary embodiments. As can be appreciated, the vehicle 100 may be any vehicle type that travels over a road surface. Although the figures shown herein depict an example with certain arrangements of elements, additional intervening elements, devices, features, or components may be present in actual embodiments. It should also be understood that FIGS. 1A and 1B are merely illustrative and may not be drawn to scale.

With initial reference to FIG. 1A, the vehicle 100 is shown to include front wheels 102 and back wheels 103 each fitted with a tire 104. The wheels 102, 103 are supported by a vehicle frame and/or linkages 106 via the suspension system shown generally at 110. The suspension system 110 generally includes one or more controlled suspension elements 112 associated with each of the wheels 102, 103. The controlled suspension elements 112 can be part of a semi-active suspension system and/or an active suspension system. In various embodiments, the controlled suspension elements 112 are controlled by one or more control signals that are determined based on a control value. As can be appreciated, the control value may be determined separately for each of the controlled suspension elements 112, may be determined separate for the controlled suspension elements 112 associated with the front wheels 102 and separate for the controlled suspension elements 112 associated with the back wheels 103, and/or may be determined for all of the controlled suspension elements 112.

The suspension system 110 further includes a control module 120 that receives inputs from one or more sensors of the vehicle 100. For exemplary purposes the disclosure will be discussed in the context of a single sensor 130. As can be appreciated, multiple sensors can be implemented in various embodiments. The sensor 130 senses observable conditions of the vehicle 100 and generates sensor signals based thereon. For example, as shown in FIG. 1B and with continued reference to FIG. 1A, the sensor 130 senses conditions associated with a roadway 132 along the vehicle's path. Such conditions may include elevation changes of a surface of the roadway 132 with respect to a defined plane. For example, the sensor 130 can be a laser beamer that measures the height of a single point along the driving path.

In various embodiments, the sensed conditions are associated with the roadway 132 in the trajectory of each of the front wheels 102. In various embodiments, the sensor 130 communicates the signals directly to the control module 120 and/or may communicate the signals to other control modules (not shown) which, in turn, communicate processed data from the signals to the control module 120 over a communication bus (not shown) or other communication means.

The control module 120 receives the signals or the processed data and processes the signals or data to determine a continuous road profile. The continuous road profile, for example, includes data points that define elevation changes of the roadway 132 in the upcoming path of the vehicle 100.

The control module 120 then computes indicators of a vehicle response to the upcoming road profile. The control module 120 then selectively determines one or more control values for controlling the one or more of the suspension elements 112 such that the vehicle ride over the upcoming road can be improved. The control module 120 generates the signals to control one or more components of the vehicle 100 based on the control values. For example, the control module 120 generates the control signals to one or more of the controlled suspension elements 112 to improve the vehicle ride.

Figure 2:
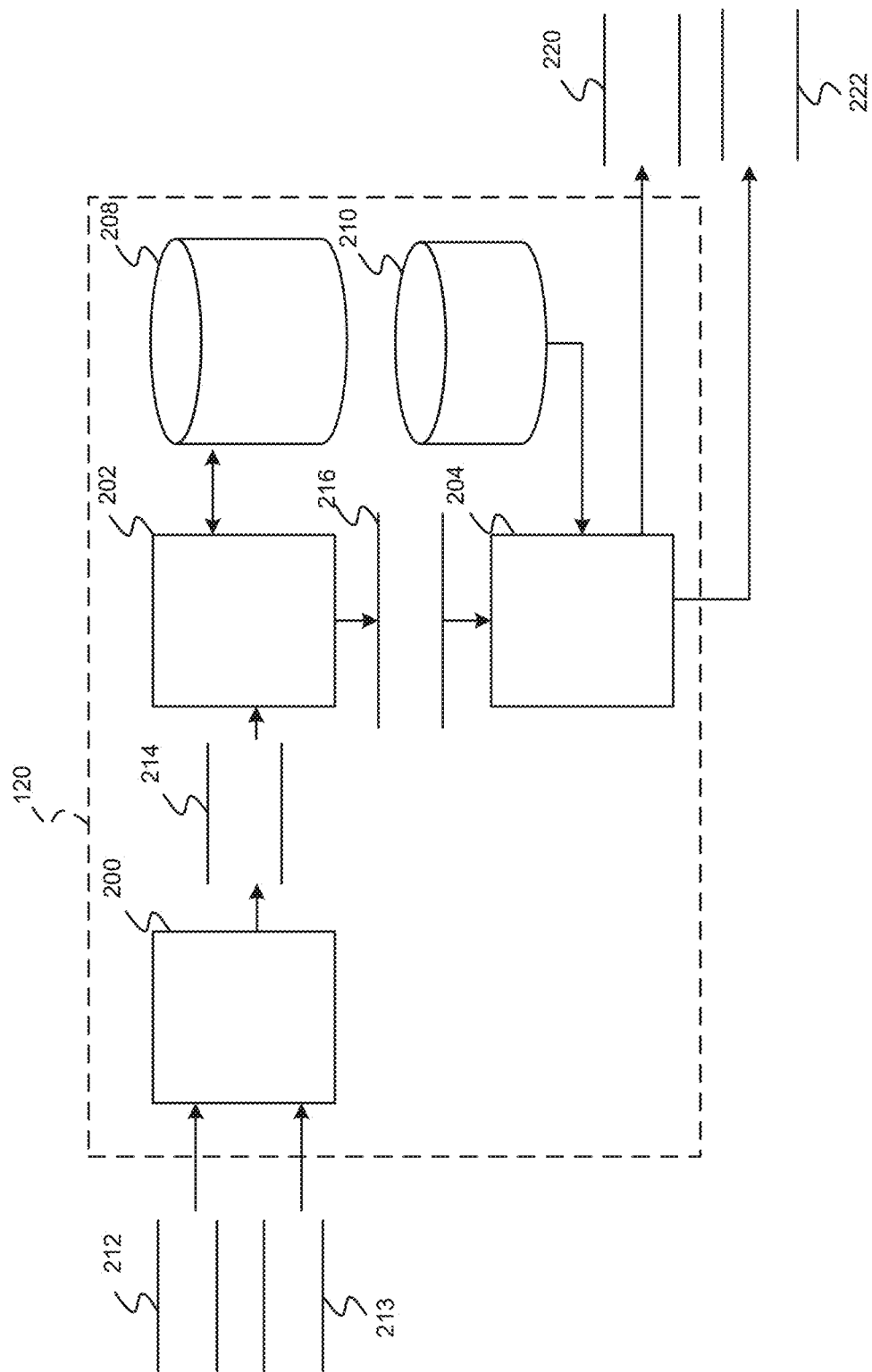
FIG. 2 is a dataflow diagram illustrating a control module of the suspension control system in accordance with various embodiments.

Referring now to FIG. 2 and with continued reference to FIGS. 1A and 1B, a dataflow diagram illustrates the control module 120 in accordance with various exemplary embodiments. As can be appreciated, various exemplary embodiments of the control module 120, according to the present disclosure, may include any number of sub-modules. In various exemplary embodiments, the sub-modules shown in FIG. 2 may be combined and/or further partitioned to similarly control one or more components of the vehicle 100 (FIG. 1) based on a determined upcoming road profile. In various exemplary embodiments, the control module 120 includes a continuous road profile determination module 200, a vehicle response determination module 202, a control value determination module 204, a vehicle model datastore 208, and a control values datastore 210.

The continuous road profile determination module 200 receives as input sensor signal data 212 and vehicle speed data 213. The sensor signal data 212 is generated, for example, by the sensor 130 as discussed above. The continuous road profile determination module 200 determines a continuous road profile 214 of the upcoming road based on the sensor signal data 212. For example, the continuous road profile determination module 200 processes the sensor signal data 212 to extract a number (N) of data points from defined timeframes (T). The data points are defined in a coordinate system associated with the vehicle 100. The data points for consecutive timeframes (t), (t+1), (t+2), etc. are then processed to construct the continuous road profile 214. For example, the continuous road profile determination module 200 performs one or more combining methods, filtering methods, time correction methods, and/or averaging methods to determine the set of data points to be included in the continuous road profile 214 based on the vehicle speed data 213. Using these methods, the continuous road profile determination module 200 continuously determines the upcoming continuous road profile 214 as the vehicle 100 is moving.

The vehicle response determination module 202 receives as input the continuous road profile 214. The vehicle response determination module 202 evaluates the continuous road profile 214 to determine whether the upcoming road is a relatively flat surface or has one or more significant elevation changes (e.g., pot holes, speed bumps, etc.). When it is determined that the upcoming road is a relatively flat surface (e.g., the data points in the road surface are within a range, or other means of determination), the vehicle response determination module 202 sets the values of the initial conditions to zero (or some other default value). When it is determined that the upcoming road includes one or more elevation changes (e.g., one or more of the data points are outside of the range, or other means of determination), the vehicle response determination module 202 maintains the values of the initial conditions as previously determined values.

Thereafter, the vehicle response determination module 202 computes predicted vehicle motion in response to the upcoming road profile based on the set initial conditions. For example, the vehicle response determination module 202 computes one or more predicted vehicle motion values 216 for each point in the continuous road profile 214. The vehicle response determination module 202 computes the predicted vehicle motion values 216 based on a defined vehicle reference model that is stored in the vehicle model datastore 208. In various embodiments, the reference model is a state-space model with seven degrees of freedom. As can be appreciated, the reference model can be associated with any number of degrees of freedom in various embodiments.

The predicted vehicle motion values 216 can be associated with motion, such as, but not limited to, roll, pitch, heave, roll rates, pitch rates, heave rates, roll acceleration, heave acceleration, pitch acceleration, suspension travel, suspension velocity, suspension acceleration, and tire forces. The predicted vehicle motion values 216 can be computed, assuming the timestep dt/N and given a state-space model in a discrete time domain represented by matrices A, B, C, D, the vehicle motion values can be computed, for example at each iteration using:

$$X(k+1)=AX(k)+Bu(k).$$

Where the input u(k) is the vertical displacement (and velocity) of the single point located at a fixed distance from the sensor 130, available as preview information, with corresponding adjustments done for the rear wheels (a delay of wheelbase/speed).

The control value determination module 204 receives as input the computed vehicle motion value(s) 216. The control value determination module 204 then determines one or more indicators of the vehicle motion. For example, the indicators can be a maximum or a minimum of the values of an associated motion (e.g., roll, pitch, heave, roll rates, pitch rates, heave rates, roll acceleration, heave acceleration, pitch acceleration, suspension travel, suspension velocity, suspension acceleration, tire forces, etc.). The control value determination module 204 then determines one or more control values 220 based on the indicators. For example, the control value determination module 204 retrieves one or more control values 220 from one or more lookup tables stored in the control values datastore 210. Each lookup table may relate to one or more indicators.

The control value determination module 204 then generates control signals 222 based on the control values 220 to control one or more of the vehicle suspension elements 112. The control value determination module 204 generates the control signals 222 at a time that is based on the vehicle speed, latency of the road profile point determination, and the distance of the event from the wheels of the vehicle 100 (e.g., one control value is determined for each wheel 102, 103).

Figure 3:
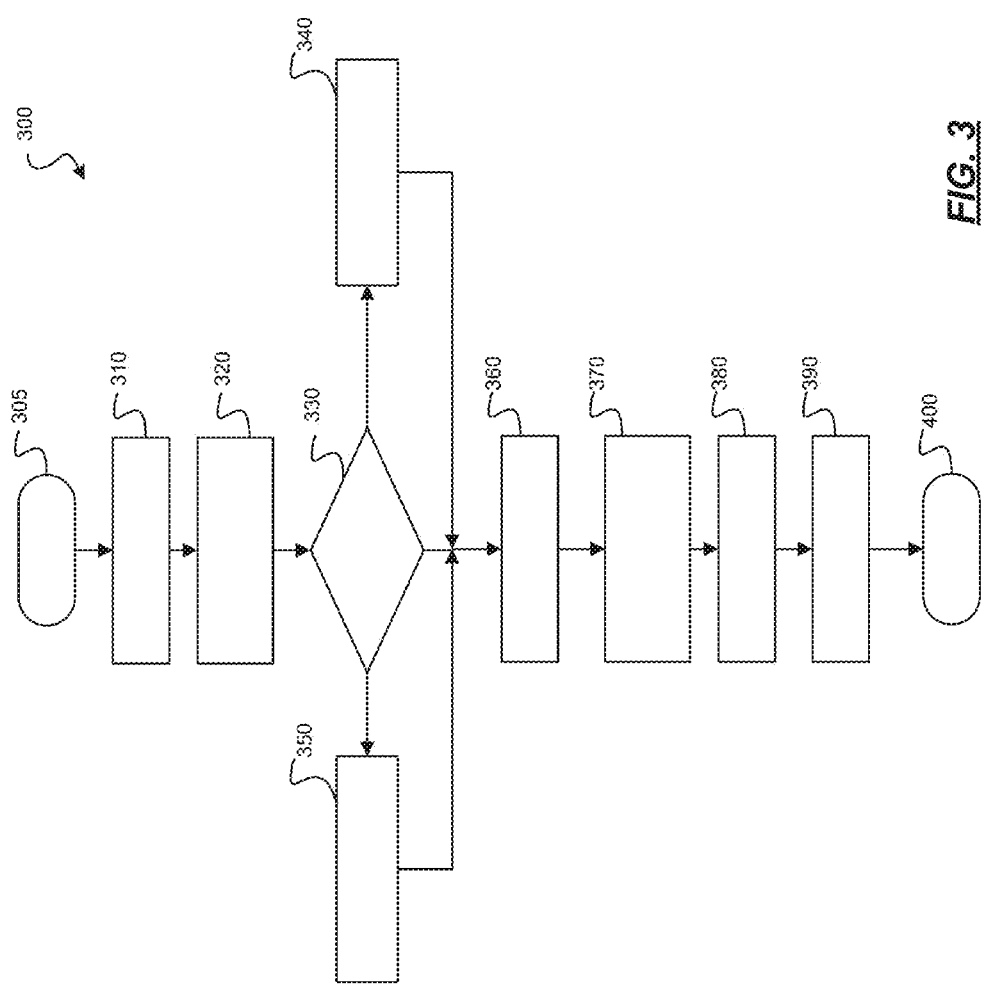
FIGS. 3 and 4 are flowcharts illustrating methods for controlling the suspension system in accordance with various embodiments.
Figure 4:
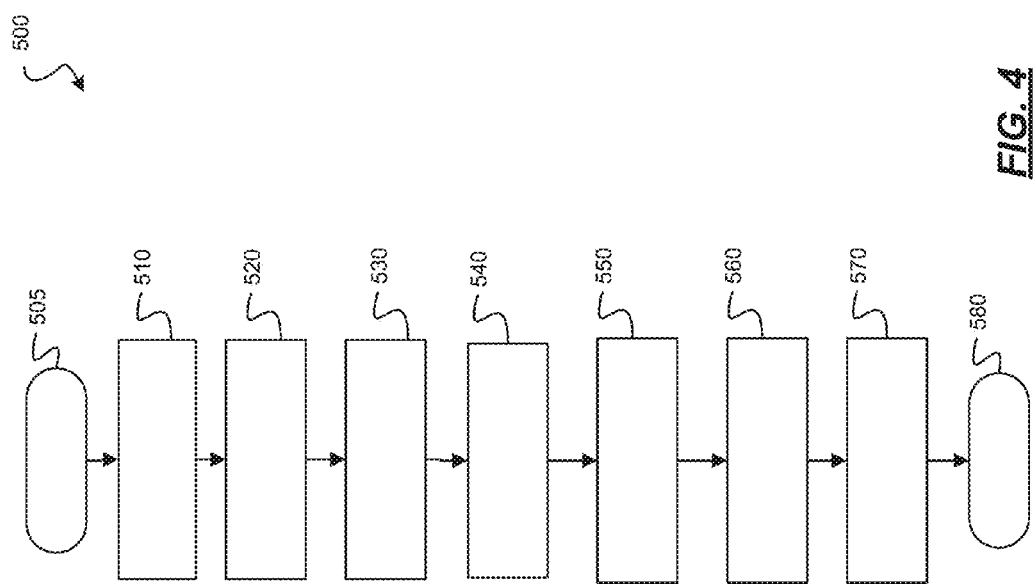

With reference now to FIGS. 3 and 4, and with continued reference to FIGS. 1A, 1B, and 2, flowcharts illustrate methods 300 and 500 for controlling the suspension system 110 based on a determined continuous road profile in accordance with various embodiments. The methods 300 and 500 can be implemented in connection with the vehicle 100 of FIG. 1A and can be performed by the control module 120 of FIG. 2, in accordance with various exemplary embodiments. As can be appreciated in light of the disclosure, the order of operation within the methods 300 and 500 is not limited to the sequential execution as illustrated in FIGS. 3 and 4, but may be performed in one or more varying orders as applicable and in accordance with the present disclosure. As can further be appreciated, the methods 300 and 500 of FIGS. 3 and 4 may be enabled to run continuously, may be scheduled to run at predetermined time intervals during operation of the vehicle 100 and/or may be scheduled to run based on predetermined events.

FIG. 3 illustrates a method of controlling the suspension system 110. As depicted in FIG. 3, the method 300 may begin at 305. The sensor signal data 212 is received at 310. The continuous road profile 214 is determined based on the sensor signal data 212 at 320. For example, the continuous road profile 214 includes a set of N data points that are associated with the road surface in the vehicle's path. The set of data points are associated with a defined timestep (e.g., every y milliseconds).

The continuous road profile 214 is then evaluated to determine whether the vehicle 100 is traveling on a relatively flat surface or a surface having one or more significant elevation changes at 330. For example, if data points within the continuous road profile 214 are within a range defined by a positive threshold and a negative threshold (e.g., a range defining little or no elevation change) at 330, then it is determined that there are no significant elevation changes and the initial conditions are set equal to approximately zero or other default number at 340. If, however, data points within the continuous road profile 214 are outside of the range at 330, then it is determined that there are significant elevation changes and the initial conditions used for computation purposes are set to the vehicle motion values computed from the previous timestep at 350.

At 360, the vehicle response values are determined based on the set initial conditions, the continuous road profile 214 and the reference model from the vehicle model datastore 208. For example, one or more vehicle response values (also referred to as a vehicle state) are computed for each point n in the set of N data points in the continuous road profile 214.

At 370, the vehicles motion values 216 are then evaluated to determine one or more indicators of the vehicle response. For example, a maximum or minimum of the vehicle motion values are determined and set as the indicator(s).

The control values 220 are then determined based on the indicator(s) at 380. For example, the value of the indicators are used to lookup the control value from one or more defined lookup tables associated with the indicator types and stored in the control values datastore 210.

The control values 220 are then used to selectively generate controls signals; and one or more of the vehicle suspension elements 112 are controlled based on the control signals at 390. For example, the control signals 222 are generated based on the vehicle speed 213, computed latency, and distance of the event from the wheels of the vehicle 100. Thereafter, the method may end at 400.

FIG. 4 illustrates a method of constructing the continuous road profile 214. As depicted in FIG. 4, the method may begin at 505. The sensor signal data 212 is received at 510 as frames of Z data points at a Y frame rate. The each frame of the sensor signal data 212 is filtered using, for example, a bandpass filter or other filter to remove excessive variation in distances and to remove outliers at 520. A time correction is then applied to each frame to properly align consecutive frames at 530. The time correction is based on the vehicle speed 213. For example, as the frame gets older, the frame corresponds to a different linear distance from the vehicle 100 due to the vehicle's motion; thus, the time correction associated with the frame is based on the vehicle speed 213.

The frames are then combined or patched together based on the associated time correction to create the continuous road profile at 540-560. For example, during the patching, the data points of the frames are aligned based on the associated time correction at 540 and the data points from overlapping frames may be averaged to obtain a single data point for that location at 550. In various embodiments, weighted averages may be applied to various points based on a distance from the vehicle 100. For example, weights may be associated with confidence values of the data points, and the weights may be applied to the data points so that data points with higher confidence (e.g., data points closer to the vehicle) sustain and data points with lower confidence (e.g., data points further from the vehicle) diminish. The data points within consecutive frames are then averaged to remove excessive variation of the road profile over time at 560. Thereafter, the remaining points are generated as the continuous road profile 214 at 570 and the method may end at 580.

While at least one exemplary embodiment has been presented in the foregoing detailed description, it should be appreciated that a vast number of variations exist. It should also be appreciated that exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

What is claimed is:

1. A method for controlling a suspension system of a vehicle, comprising:
   receiving, by a processor, sensor data from a laser beamer, the sensor data including points that define elevation changes of a roadway in an upcoming path of the vehicle;
   determining, by a processor, a continuous road profile based on the sensor data points;
   computing, by a processor, one or more predicted vehicle motion values for each sensor data point in the continuous road profile based on a state space model of the vehicle;
   determining one or more indicators of vehicle motion based on the vehicle motion values; and
   selectively controlling, by a processor, at least one suspension element of the vehicle based on the one or more indicators of vehicle motion.

2. The method of claim 1, wherein the one or more predicted vehicle motion values is associated with at least one of roll, pitch, heave, roll rates, pitch rates, heave rates, roll acceleration, heave acceleration, pitch acceleration, suspension travel, suspension velocity, suspension acceleration, and tire force.

3. The method of claim 1, wherein the determining the one or more indicators is based on at least one of a maximum and a minimum of the predicted vehicle motion values.

4. The method of claim 1, further comprising: selectively setting initial conditions associated with the one or more predicted vehicle motion values; and wherein the determining the one or more predicted vehicle motion values is based on the initial conditions.

5. The method of claim 4, wherein the selectively setting the initial conditions comprises setting the initial conditions to a default number when the road profile indicates a substantially flat roadway.

6. The method of claim 4, wherein the selectively setting the initial conditions comprises setting the initial conditions to at least one previous vehicle motion response when the road profile indicates one or more elevation changes.

7. The method of claim 1, wherein the determining the continuous road profile is based on at least one of a combining method, an averaging method, a filtering method, and a time correction method associated with the plurality of data points.

8. A system for controlling a suspension system of a vehicle, comprising:
   at least one laser beamer sensor that generates sensor signals based on conditions of a roadway in upcoming path of the vehicle, the sensor signals including points that define elevation changes of the roadway in the upcoming path of the vehicle; and
   a control module that receives the sensor signals, that determines a continuous road profile based on the points, that computes one or more predicted vehicle motion values for each sensor data point in the continuous road profile based on a state space model of the vehicle, that determines one or more indicators of vehicle motion based on the one or more predicted vehicle motion values; and that selectively controls at least one suspension element of the vehicle based on the one or more indicators of vehicle motion.

9. The system of claim 8, wherein the one or more predicted vehicle motion values is associated with at least one of roll, pitch, heave, roll rates, pitch rates, heave rates, roll acceleration, heave acceleration, pitch acceleration, suspension travel, suspension velocity, and suspension acceleration.

10. The system of claim 8, wherein the control module determines the indicator based on at least one of a maximum and a minimum of the at least one predicted vehicle motion response.

11. The system of claim 8, wherein the control module selectively sets initial conditions associated with the one or more predicted vehicle motion values and determines the one or more predicted vehicle motion values based on the initial conditions.

12. The system of claim 11, wherein the control module selectively sets the initial conditions by setting the initial conditions to a default number when the continuous road profile indicates a substantially flat roadway.

13. The system of claim 11, wherein the control module selectively sets the initial conditions by setting the initial conditions to at least one previous vehicle motion response when the continuous road profile indicates one or more elevation changes.

14. The system of claim 8, wherein the determining the continuous road profile is based on at least one of a combining method, a filtering method, a time correction method, and an averaging method associated with the plurality of data points.

* * * * *